(12) United States Patent
Chen

(10) Patent No.: US 12,479,273 B2
(45) Date of Patent: Nov. 25, 2025

(54) VENTILATION DEVICE FOR AIR FLOWING INSIDE AND OUTSIDE A VEHICLE

(71) Applicant: Jiaxing Hangong Automobile Fastener Co., Ltd., Jiaxing (CN)

(72) Inventor: Jun Chen, Jiaxing (CN)

(73) Assignee: Jiaxing Hangong Automobile Fastener Co., Ltd., Jiaxing (CN)

( * ) Notice: Subject to any disclaimer, the term of this patent is extended or adjusted under 35 U.S.C. 154(b) by 377 days.

(21) Appl. No.: 18/249,488

(22) PCT Filed: Oct. 9, 2021

(86) PCT No.: PCT/CN2021/122768
§ 371 (c)(1),
(2) Date: Apr. 18, 2023

(87) PCT Pub. No.: WO2022/083454
PCT Pub. Date: Apr. 28, 2022

(65) Prior Publication Data
US 2023/0356565 A1    Nov. 9, 2023

(30) Foreign Application Priority Data
Oct. 22, 2020    (CN) .......................... 202011139488.8

(51) Int. Cl.
*B60H 1/26*    (2006.01)
(52) U.S. Cl.
CPC ..................................... *B60H 1/26* (2013.01)

(58) Field of Classification Search
CPC ........... B60H 1/26; B60H 1/249; B60H 1/248
See application file for complete search history.

(56) References Cited

U.S. PATENT DOCUMENTS

| | | | |
|---|---|---|---|
| 2005/0189024 A1* | 9/2005 | Dippel ................. | F16K 15/035 137/855 |
| 2015/0165873 A1* | 6/2015 | Schwarzkopf ........ | F16K 15/031 454/70 |
| 2018/0215236 A1* | 8/2018 | Carlson ................ | F24F 11/745 |
| 2019/0054803 A1* | 2/2019 | Carlson ................ | B60H 1/249 |
| 2019/0270362 A1* | 9/2019 | Barnes .................. | F16K 17/02 |
| 2020/0062084 A1* | 2/2020 | Porter ................... | B60H 1/249 |
| 2020/0189359 A1* | 6/2020 | Barnes .................. | B60H 1/249 |

* cited by examiner

*Primary Examiner* — Ko-Wei Lin
(74) *Attorney, Agent, or Firm* — Wang Law Firm, Inc.

(57) ABSTRACT

A ventilation device for air flowing inside and outside a vehicle includes a mounting frame and a plurality of valve plates. The mounting frame includes a primary frame and a plurality of secondary frame bodies. Each of the secondary frames includes a frame, a vent, and a clamping component. Each of the clamping components includes a connecting plate and a retaining plate. Each the valve plate covers the vent and comprises at least one socket slot. The valve plates are located between the two retaining plates and the vent. The ventilation device can not only rapidly return to an original state after the air pressure inside and outside the vehicle is balanced, but can also reduce noise from outside the vehicle as much as possible, and improve the vehicle usage experience of a user.

11 Claims, 6 Drawing Sheets

VENTILATION DEVICE FOR AIR FLOWING INSIDE AND OUTSIDE A VEHICLE

RELATED APPLICATION

This present application claims benefit of the PCT Application, PCT/CN2021/122768, filed on Oct. 9, 2021.

BACKGROUND

1. Technical Field

The present invention relates to a ventilation technology for motor vehicles, and more particularly to a ventilation device for air flowing inside and outside vehicle.

2. Description of the Related Art

In motor vehicle, such as cars, SUVs, and other vehicles or new energy vehicles, when a door is closed, the air will be compressed into the vehicle so as for forming high pressure. The high pressure will not only make the people in the vehicle uncomfortable, but also sometimes damage the vehicle equipment, such as glass. Therefore, ventilation devices are installed onto the door or frame of the vehicle to balance the air pressure inside and outside the vehicle when the door is closed.

Based on the above application occasions and requirements, American U.S. Pat. No. 5,823,870 and European patent EP0915302 both disclose such ventilation devices. However, the active margin of the valve plate in the ventilation device in the prior art is too large, and the gap will still be generated in its closed state, which is not conducive to isolating external noise so as to improve the comfort of the vehicle.

Therefore, it is necessary to provide a ventilation device for air flowing inside and outside vehicle which makes it possible to solve the above problem.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

Figure 1:
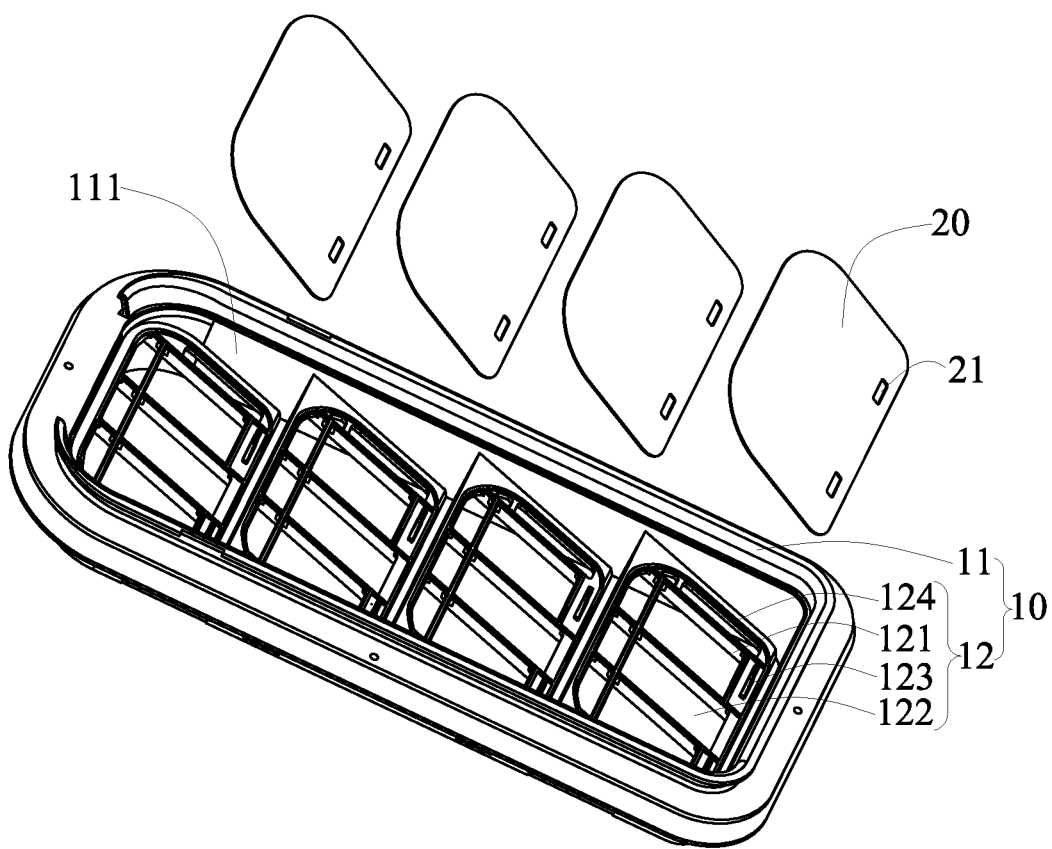
FIG. 1 is an explosion schematic view of a ventilation device for air flowing inside and outside vehicle in a way according to the present invention.
Figure 2:
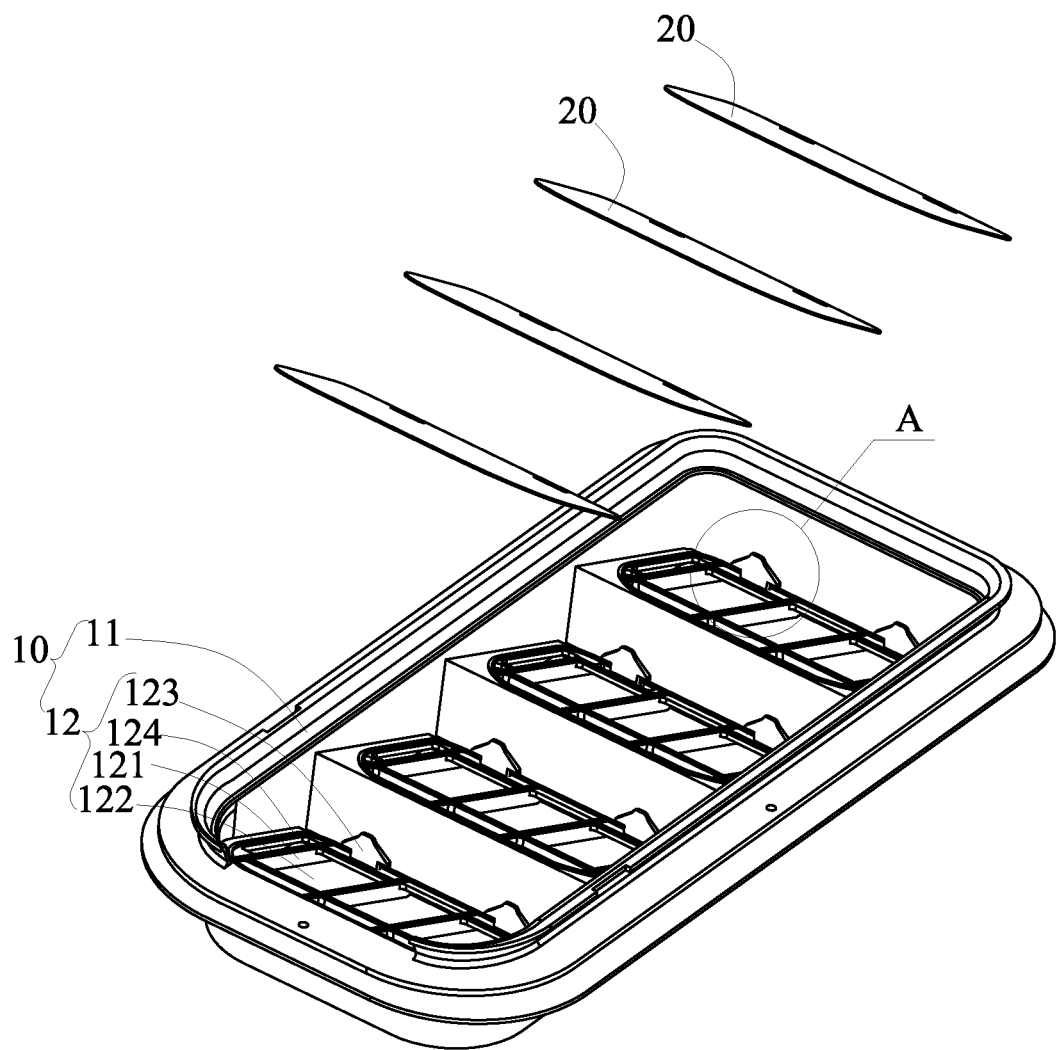
FIG. 2 is an explosion schematic view of the ventilation device for air flowing inside and outside vehicle of FIG. 1 in another way.
Figure 3:
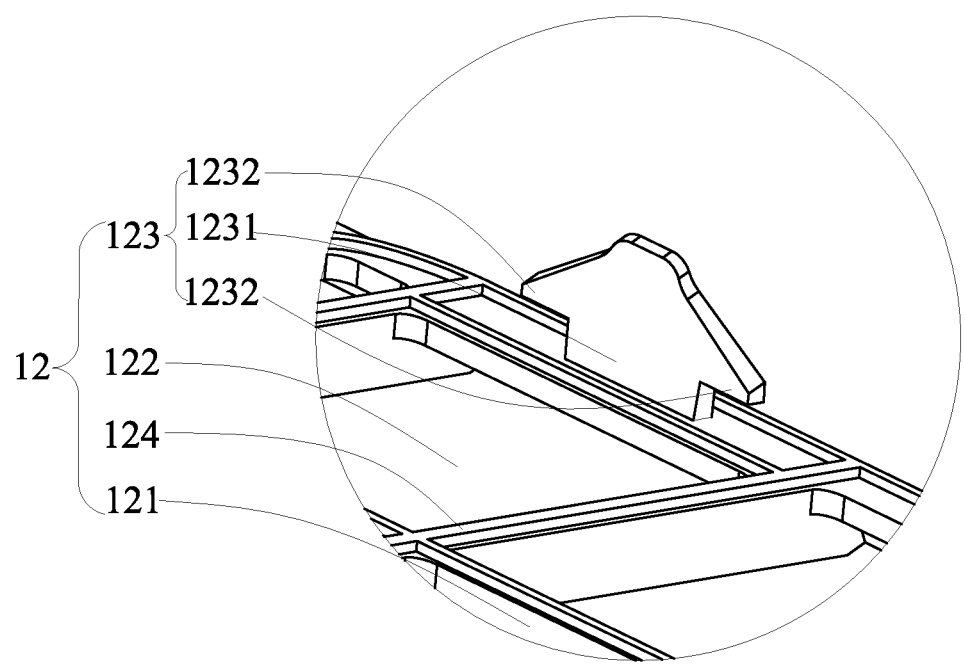
FIG. 3 is a partial enlarged schematic view of the ventilation device for air flowing inside and outside vehicle of FIG. 1 in A.
Figure 4:
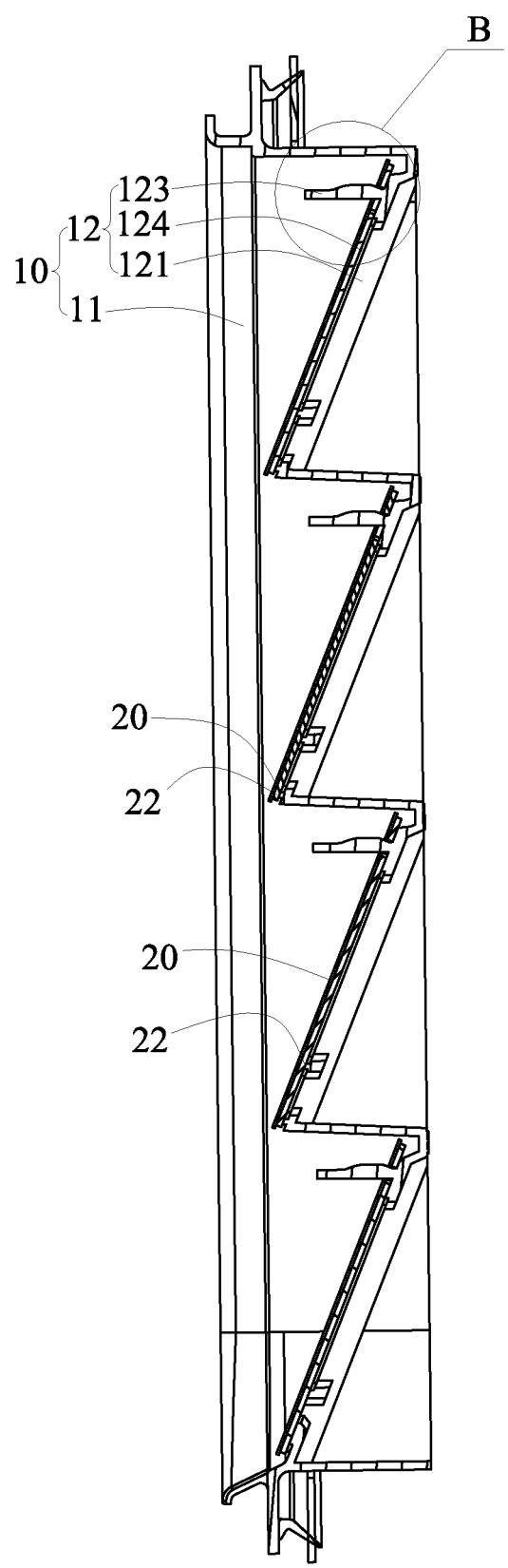
FIG. 4 is a section schematic view of the ventilation device for air flowing inside and outside vehicle of FIG. 1.

The present application is illustrated by way of example and not by way of limitation in the figures of the accompanying drawings. It should be noted that references to "an" or "one" embodiment in this application are not necessarily to the same embodiment, and such references mean at least one.

Referring to FIG. 1 to FIG. 6, a ventilation device for air flowing inside and outside vehicle is shown in accordance with an exemplary embodiment of the present invention. The ventilation device for air flowing inside and outside vehicle includes a installing frame 10, and a plurality of valve plates 20 arranged in the installing frame 10. It can be understood that the ventilation device for air flowing inside and outside vehicle also includes other functional structures, such as installation structure, sealing structure, and so on, which are familiar to a person skilled in the art, and will not be described in detail.

As a prior art, the installing frame 10 is installed on the vehicle body and is generally made of hard plastic and is made by injection molding. The installing frame 10 includes a primary frame 11, and a plurality of secondary frames 12 arranged in the primary frame 11. The installing frame 10 also includes other structures, such as clamping structure, sealing structure, and matching structure with other parts, which are not described in detailed here. The primary frame 11 includes a mounting hole 111. The mounting hole 111 is configured for disposing the plurality of the secondary frames 12. The shape and axial depth of the mounting hole 111 can be designed according to actual needs. In the present embodiment, the mounting hole 111 is a rectangular hole. The secondary frame 12 is integrally molded with the primary frame 11, and each of the secondary frames 12 has the same structure. Each of the secondary frames 12 includes a frame 121, at least one vent 122 arranged on the frame 121, at least one clamping component 123 arranged on the frame 121, and a sealing strip 124 arranged around the vent 122. The frame 121 is fixed on the primary frame 11 and is integrally molded with the primary frame 11. In the present embodiment, each of the secondary frames 12 has three vents 122. The three vents 122 are opened in the frame 121, and the arranging direction of the three vents 122 is perpendicular to that of the secondary frames 12. In the present embodiment, the installing frame 10 includes four secondary frames 12, and the planes where the vents 122 of the four secondary frames 12 are respectively located are parallel to each other. In order to take advantage of gravity, that is to say, under the action of gravity, the valve plates 20 can be pressed on the three vents 122 of a secondary frame 12 in a static state. Therefore, an angle between a plane located in the three vents 122 and a plane located in the mounting hole 111 is acute so as that the valve plates 20 cover and press on the vent 122 by the installing angle of the mounting frame 10 under gravity. Moreover, for the four secondary frames 12, the planes where the vents 122 are opened are parallel to each other so as to synchronize movement.

The clamping component 123 is arranged at a connection of the two secondary frames 12 and includes a connecting plate 1231 connecting to the frame 121, two retaining plates 1232 respectively arranged on both sides of the connecting plate 1231, and a clamping part 1233 arranged on the connecting plate 1231 and facing away from the vent 122. An angle between an extension direction of the connecting plate 1231 and the plane located on the vent 122 is acute so as to make the clamping component 123 provide a component force to press the valve plates 20 onto the vent 122. Further, when the air pressure inside and outside the vehicle is balanced, the valve plates 20 can quickly return to the initial position. The two retaining plates 1232 are separated on both sides of the connecting plate 1231. An arranging direction of the two retaining plates 1232 is perpendicular to that of the plurality of the secondary frames 12. Moreover, in the present embodiment, each of the secondary frames 12 has two clamping parts 1233. An arranging direction of the two clamping parts 1233 is perpendicular to that of the secondary frame 12. An arrangement direction of the two clamping parts 1233 of each of the secondary frames 12 is parallel to that of the clamping components 123. On the section perpendicular to the arrangement direction of the plurality of secondary frames 12 the retaining plate 1232 is a wedge-shaped structure and a right angle edge of the wedge-shaped structure is connected with the connecting plate 1231, and the other right-angle edge being arranged relative to an inclined edge of the wedge-shaped structure towards the vent 122 so as to form an umbrella structure, which is conductive to the valve plates 20 being clamped into the clamping component 123. A size of the two retaining plates 1232 should match that of a socket slot 21 of the valve plate 20, which will be described in detail with the valve plate 20. Since the valve plate 20 is retained between the right angle edge of the retaining plates 1232 and the frame 121, the valve plate 20 is bent at the position in contact with the retaining plate 1232 when the valve plates 20 pivot from the stationary position to the open direction. Due to the deformation caused by the bending of the valve plate 20, it has a restoring force to restore the original position. Therefore, when the air pressure inside and outside the vehicle is balanced, the valve plate 20 can immediately return to the original position so as to prevent noise from entering the vehicle as far as possible. On a cross-section along the arrangement direction of the plurality of secondary frames 12, an outline of the clamping part 1233 includes a fitting line 1234 connected to the secondary frame 12, and a transition line 1235 connected to the fitting line 1234. The fitting line 1234 is perpendicular to the plane where the vent 122 is located. Therefore, when the valve plate 20 is in a stationary position, the valve plate 20 can fully adhere to the plane where the vent 122 is located, and gaps can be avoided as much as possible. When the air pressure inside and outside the vehicle is balanced, the fitting line 1234 helps to quickly restore the bent part of the valve plate 20 to its original state. That is to say, the fitting line 1234 can provide a restoring force for the valve plate 20 to restore its original state so as to enable the valve plate 20 to rest at the closed position immediately under the action of gravity. Since an angle is arranged between an extension direction of the fitting line 1234 and an extension direction of the connecting plate 1231, the transition line 1235 is required to connect the other end of the fitting line 1234 to the connecting plate 1231. Therefore, the clamping part 1233 is configured from a protrusion set on the connecting plate 1231. So the clamping part 1233 is beneficial for limiting the range of movement of the valve plate 20 and preventing it from sliding out.

The sealing strip 124 is disposed on a periphery of the vent 122 and may protrude out the plane where the vent 122 is located. The sealing strip 124 can be assembled in many ways, such as opening a groove around the vent 122, and then filling the sealing strip 124 in the groove. The sealing strip 124 can also be adhered to the periphery of the vent 122 by adhesive. The sealing strip 124 can be made of flexible materials such as silicone material. The valve plate 20 covers the sealing strip 124.

The valve plate 20 may be made of flexible materials, such as silicone material, and is used to cover the vent 122. Specifically, since each of the secondary frames 12 has the three vents 122 opened therein, the valve plates 20 are respectively cover onto the three vents 122. As the valve plate 20 is made of flexible materials, it has certain elasticity, which is convenient to set the valve plate 20 on the clamping component 123. The details will be explained later. A non-woven fabric layer 22 can be arranged below the valve plate 20, and the function of the non-woven fabric layer 22 is to reduce noise. Because the valve plate 20 may be made of silicone and quickly restores to its closed position by gravity, it will make a "popping" sound. To eliminate the sound, the non-woven fabric layer 22 is placed below the valve plate 20. It is precisely due to the presence of the non-woven fabric layer 22 that the restoring force of the valve plate 20 is reduced and it is necessary to set the above-mentioned fitting line 1234. The valve plate 20 includes at least one socket slot 21. In the present embodiment, the valve plate 20 has two socket slots 21. The two socket slots 21 are respectively set on the clamping components 123. In order to set and clamp the valve plate 20, a length of the socket slot 21 along the arrangement direction perpendicular to the multiple secondary frames 12 is less than the maximum distance of the two retaining plates 1232 of the clamping component 123, and a width of the socket slot 21 is equivalent to a thickness of the clamping component 123 along the arrangement direction of the multiple secondary frames 12. And a distance between the retaining plates 1232 and the plane where the vent 122 is located is larger than or equal to a thickness of the valve plate 20. Therefore, when the socket slot 21 is set into the connecting plate 1231 of the clamping component 123, the socket slot 21 will first pop open by the two retaining plates 1232, and when the socket slot 21 is sleeved into the connecting plate 1231, the socket slot 21 will return to its original size. Therefore, both sides of the length direction of the socket slot 21 of the valve plate 20 are located between the two retaining plates 1232 and the vent 122, and then the valve plate 20 and the two clamping components 123 can be fixed together to avoid separation from the clamping component 123. As the valve plate 20 has a small thickness, the opening direction of the socket slot 21 should be perpendicular to the plane where the valve plate 20 is located. Therefore, when the fitting line 1234 is perpendicular to the plane where the vent 122 is located and the valve plate 20 is in a stationary position, the valve plate 20 can fully fit with the plane where the ventilation port 122 is located so as to improve the sealing effect.

Figure 5:
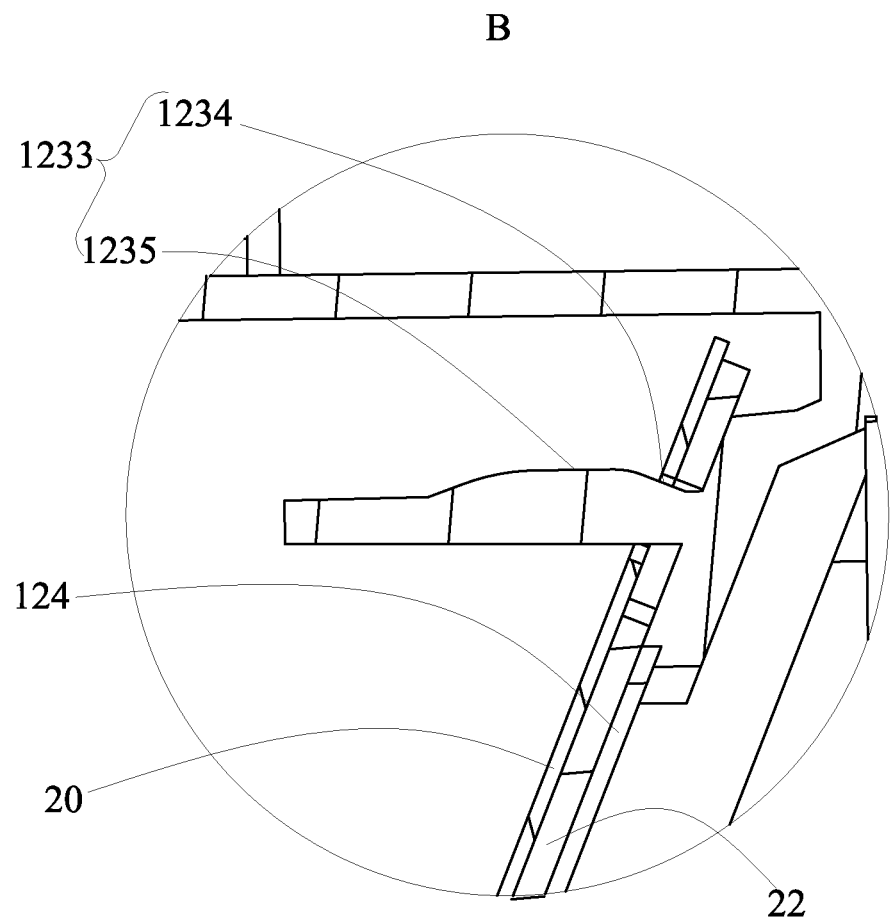
FIG. 5 is an isometric view of the ventilation device for air flowing inside and outside vehicle of FIG. 1 which has at least one valve plate stopper.

Preferably, as shown in FIG. 5, each of the secondary frames 12 further includes at least one valve plate stopper 125. The valve plate stopper 125 is arranged for pressing the valve plate 20 towards the vent 122. Therefore, when the valve plate 20 pivots in its open direction, the valve plate stopper 125 can prevent the valve plate 20 from excessive overturning or deformation. Further, when the pressure inside and outside vehicle is balanced and the valve plate 20 returns to its original state, the valve plate 20 can return to its static position more thoroughly and better fit with the sealing strip 124 to achieve better sealing.

As shown in FIG. 5, corresponding to the number of the clamping components 123, each of the secondary frames 12 has two valve plate stoppers 125 disposed thereon. The valve plate stopper 125 is preferably hinged on the clamping components 123. Understandably, the number of the valve plate stoppers 125 need not be the same as that of the clamping components 123, and the valve plate stopper 125 can also be set on the secondary frame 12 in other ways. For example, in an embodiment not shown, three clamping components 123 are formed on the frame 121, and only one or two of the clamping components 123 has the valve plate stopper 125 disposed thereon. Moreover, the valve plate stopper 125 may also be directly formed on the frame 121 of the secondary frame 12, which is also within the scope of the invention.

Figure 6:
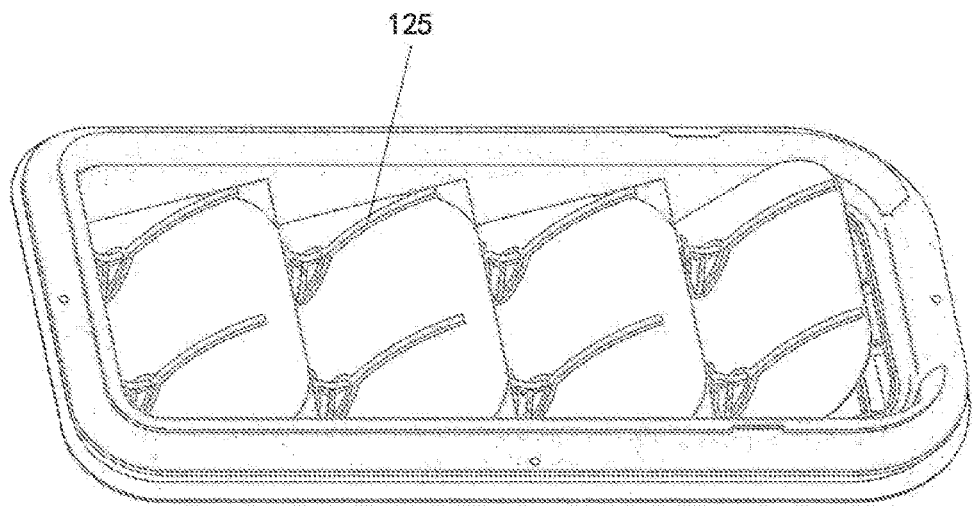
FIG. 6 is an isometric view of the valve plate stopper of FIG. 5.
Figure 7:
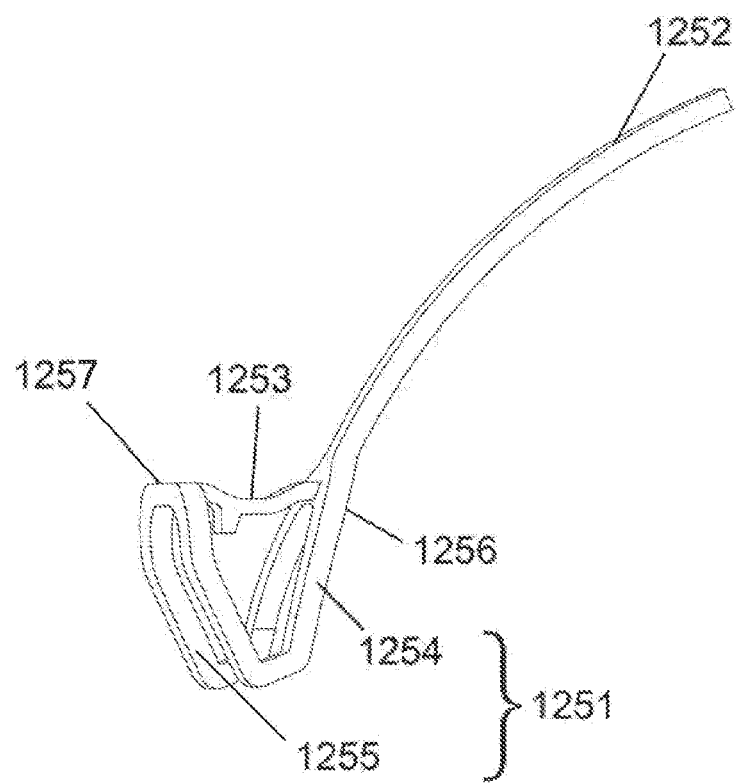

As shown in FIG. 6, the valve plate stopper 125 includes a mounting seat 1251 and a stop rod 1252 extending from the mounting seat 1251. The stop rod 1252 extends along the arrangement direction of the vent 122. In addition, the retaining rod 1252 is preferably bent into an upward arch shape.

As shown in FIG. 6, the mounting seat 1251 may be a V-shaped structure combined with each other and includes a first V-shaped part 1254 and a second V-shaped part 1255. The vertex of the first V part 1254 is separated from that of the second V part 1255 so as for forming the bottom of the mounting base 1251. On the top of the mounting base 1251, ends of two legs of the first V-shaped part 1254 are connected with that of the second V-shaped part 1255. Therefore, two connecting points are formed between the first V-shaped part 1254 and the second V-shaped part 1255. As shown in FIG. 6, the two connecting points are respectively shown by a first connecting point 1256 and a second connecting point 1257. The stop rod 1252 extends from one of the first, second connecting points 1256, 1257.

The stop rod 1252 further includes a push rod 1253. The push rod 1253 is connected between the first connecting point 1256 and the second connecting point 1257 at the top of the mounting seat 1251.

The valve plate stopper 125 or at least the mounting seat 1251 of the valve plate stopper 125 may be made of elastic material so as to facilitate the installation of the valve plate stopper 125. Moreover, when not stressed, the push rod 1253 bends slightly downward and has a concave shape.

When the valve plate stopper 125 is installed, the mounting seat 1251 is inserted from a top of the clamping components 123. During insertion, the retaining plates 1232 of the clamping component 123, which has a wedge structure, makes the mounting seat 1251 deform and pop open. Therefore, a distance between the free ends of the first, second V-shaped parts 1255, 1256 increases. When the free ends of the first V-shaped part 1254 and the second V-shaped part 1255 cross the retaining plate 1232, the mounting seat 1251 returns to its original state. And then, the free ends of the first V-shaped part 1254 and the second V-shaped part 1255 are pressed between the retaining plates 1232 and the frame 121.

Further, when the valve plate stopper 125 is installed, the push rod 1253 presses against the clamping component 123 so as to prevent the valve plate stopper 125 from rocking. Preferably, the push rod 1253 is elastically deformable and bent downward, and when the push rod 1253 presses against the top of the clamping component 123, it will be slightly deformed. Therefore, a retaining force is provided to keep the mounting seat 1251 of the valve plate stopper 125 on the clamping component 123.

As described above, since the ventilation device has the clamping component 123 on the secondary frame 12 and the valve plate 20 disposed on the clamping component 123, it can instantly balance the air pressure inside and outside the vehicle so as to avoid making passengers uncomfortable and improve driving experience. Specifically, the clamping component 123 has an umbrella-shaped structure and includes the connecting plate 1231 and two retaining plates 1232 respectively arranged on two sides of the connecting plate 1231. The connecting plate 1231 is configured for inserting into the socket slot 21 and the valve plate 20 is clamped between the retaining plates 1232 and the frame 121 of the second frame 12. Since the retaining plate 1232 is the wedge-shaped structure and a right angle edge of the wedge-shaped structure is connected with the connecting plate 1231, and the other right-angle edge being arranged relative to an inclined edge of the wedge-shaped structure towards the vent 122, and the valve plate 20 is made of flexible material, the socket slot 21 can be propped open by the retaining plate 1232 when the connecting plate 1231 inserts into the socket slot 21, and the socket slot 21 is sleeved into the connecting plate 1231 without being broken. Therefore, the corresponding part of the valve plate 20 is located between the two retaining plates 1232 and the vent 122. When the air pressure inside the vehicle is larger than that outside the vehicle, the valve plate 20 will be opened under the action of air pressure and will bend at the position where it contacts with the retaining plate 1232, which not only makes it possible to quickly return to the original state after the air pressure inside and outside the vehicle is balanced, but also makes the valve plate 20 more tightly covered and presses on the vent 122 due to the action of the retaining plate 1232. When the valve plate 20 tightly covers the vent 122, it can reduce the noise from outside the vehicle as much as possible and improve driving experience. Moreover, since the arrangement direction of the two retaining plates 1232 is perpendicular to that of the plurality of the secondary frames 12, it makes the opening of the valve plate 20 relative to the vent 122 large enough to benefit improving ventilation capacity. Furthermore, since the angle between the extension direction of the connecting plate 1231 and the plane where the vent 122 is located is acute, the clamping component 123 can provide a component force to press the valve plate 20 towards the vent 122. Therefore, the valve plate 20 can quickly return to the initial position after the air pressure inside and outside the vehicle is balanced.

While the disclosure has been described by way of example and in terms of exemplary embodiment, it is to be understood that the disclosure is not limited thereto. To the contrary, it is intended to lamp shade various modifications and similar arrangements (as would be apparent to those skilled in the art). Therefore, the scope of the appended claims should be accorded the broadest interpretation so as to encompass all such modifications and similar arrangements.

The invention claimed is:

1. A ventilation device for air flowing inside and outside vehicle, comprising:
an installing frame, the installing frame comprising a primary frame and a plurality of secondary frames arranged in the primary frame, the plurality of the secondary frames having identical structure and each of the plurality of secondary frames comprising a frame, at least one vent disposed in the frame, and at least one clamping component disposed on the frame, the at least one clamping component having an umbrella-shaped structure and comprising a connecting plate, two retaining plates respectively arranged on two sides of the connecting plate, and a clamping part arranged on the connecting plate, the connecting plate extending from a plane where the at least one vent is located and an angle between the extension direction of the connecting plate and the plane being acute, an arrangement direction of the two retaining plates being perpendicular to that of the plurality of the secondary frames, on a cross section perpendicular to the arrangement direction of the plurality of secondary frames each of the retaining plates being a wedge structure and a right angle edge of the wedge-shaped structure being connected with the connecting plate, and the other right-angle edge being arranged relative to an inclined edge of the wedge-shaped structure towards the at least one vent, the clamping part being located on the side facing away from the at least one vent, and on the cross-section along the arrangement direction of the plurality of secondary frames an outline of the clamping part including a fitting line connected to the secondary frame and a transition line connected to the fitting line, the fitting line being perpendicular to the plane where the at least one vent is located;

each of the plurality of secondary frames further comprising at least one valve plate stopper, the at least one valve plate stopper is disposed on the frame or the clamping component, the at least one valve plate stopper comprising a mounting seat and a stop rod extending from the mounting seat, the mounting seat comprising a first V-shaped part and a second V-shaped part, the vertex of the first V-shaped part being separated from that of the second V-shaped part so as for forming the bottom of the mounting seat, on the top of the mounting seat, ends of two legs of the first V-shaped part being connected with that of the second V-shaped part, a first connecting point and a second connecting point being formed between the first V-shaped part and the second V-shaped part, the stop rod extending from one of the first, second connecting points, a push rod being arranged on the top of the mounting seat, the push rod extending from the first connecting point to the second connecting point; and a plurality of valve plates arranged in the installing frame, the plurality of valve plates made of flexible material and covering the at least one vent when an air pressure inside and outside vehicle is balance, the plurality of valve plates comprising at least one socket slot, the plurality of valve plates being located between the two retaining plates and the at least one vent.

2. The ventilation device for air flowing inside and outside vehicle as claimed in claim 1, wherein the primary frame comprise an installing hole configured for disposing the plurality of secondary frames, an angle between the plane where the at least one vent is located and a plane where the installing hole is located is acute.

3. The ventilation device for air flowing inside and outside vehicle as claimed in claim 1, wherein the installing frame comprises four secondary frames, the planes where the at least one vent of the four secondary frames are respectively located are parallel each other.

4. The ventilation device for air flowing inside and outside vehicle as claimed in claim 1, wherein each of the plurality of secondary frames further comprises a sealing strip disposed on a periphery of the at least one vent, each of the plurality of valve plates covers on the sealing strip.

5. The ventilation device for air flowing inside and outside vehicle as claimed in claim 1, wherein a length of the at least one socket slot along a direction perpendicular to the arrangement direction of the plurality of the secondary frames is less than a maximum distance between the two retaining plates.

6. The ventilation device for air flowing inside and outside vehicle as claimed in claim 1, wherein a distance between the retaining plate and the plane where the at least one vent is located is larger than or equal to a thickness of each valve plate.

7. The ventilation device for air flowing inside and outside vehicle as claimed in claim 1, wherein when each of the plurality of valve plates is in a static position, the valve plate tightly covers the at least one vent by gravity.

8. The ventilation device for air flowing inside and outside vehicle as claimed in claim 1, wherein the at least one clamping component is arranged at a connection of two adjacent secondary frames.

9. The ventilation device for air flowing inside and outside vehicle as claimed in claim 1, wherein a maximum distance between the retaining plate and the plane where the at least one vent is located is equal to a thickness of a valve plate of the plurality of valve plates.

10. The ventilation device for air flowing inside and outside vehicle as claimed in claim 1, wherein each of the plurality of secondary frames comprises two clamping components, an arrangement direction of the two clamping components of each of the plurality of secondary frames is parallel to that of the two clamping components.

11. The ventilation device for air flowing inside and outside vehicle as claimed in claim 1, wherein the push rod is elastically deformable and when not stressed the push rod bends slightly downward and has a concave shape.

* * * * *